UNITED STATES PATENT OFFICE 2,220,211

POLYMERIZATION OF UNSATURATED COMPOUNDS

Newcomb K. Chaney, Moylan, Pa., assignor to The United Gas Improvement Company, a corporation of Pennsylvania No Drawing. Application January 19, 1938, Serial No. 185,695

12 Claims. (Cl. 260—93)

This invention pertains generally to the polymerization of unsaturated compounds, and pertains particularly to the polymerization of such compounds through the use of boron trifluoride as a catalyst.

The invention will be described in connection with the polymerization of cyclopentadiene to which it is particularly applicable.

Cyclopentadiene may be polymerized into at least two broad types of polymers, one of which is characterized by being soluble in solvents such as benzene, toluene, high flash naptha, chloroform, and carbon tetrachloride, and the other of which is characterized by being insoluble in these solvents.

In the polymerization of cyclopentadiene using boron trifluoride gas as a catalyst considerable difficulty is experienced in obtaining the soluble type of polymer.

For instance, when the temperature is maintained above approximately 30° C. and the concentration of cyclopentadiene is above approximately 20% the passing of boron trifluoride gas into a cyclopentadiene solution almost invariably results in the formation of insoluble polymer. It requires the utmost precaution and most careful manipulation to obtain soluble polymer.

At temperatures below approximately 30° C. and concentrations of cyclopentadiene below approximately 30% either all insoluble polymer or mixtures of soluble and insoluble polymer are obtained. This holds true even though the temperature is reduced to —30° or —40° C.

As a result of extensive experimentation it has been quite satisfactorily established that during the course of the polymerization cyclopentadiene passes through the soluble state before reaching the insoluble state, that proportion of catalyst is a factor determining whether the reaction will reach the insoluble state, and that the formation of insoluble polymer by the bubbling of boron trifluoride gas into the solution is due to the high concentration of catalyst in the individual boron trifluoride bubbles.

I have discovered that if the boron trifluoride gas is diluted such as with an inert gaseous substance, of which nitrogen is an example, the polymerization reaction may be controlled to the extent that soluble polymer may be formed to the total exclusion of insoluble polymer.

While any degree of dilution of the gaseous catalyst will afford a measure of control, I prefer to employ the gaseous catalyst in dilutions of at least 50% or more. I find, for instance, that a mixture of 2% boron trifluoride and 98% nitrogen is very satisfactory.

In the polymerization of cyclopentadiene it should be kept in mind that there are at least four factors, in addition to local concentration of catalyst, which influence the character of the final product. These four additional factors are (1) temperature, (2) concentration of cyclopentadiene, (3) proportion of uniformly distributed catalyst, (4) reaction time.

Generally speaking, and all other conditions remaining the same, it appears that there is a threshold temperature for the formation of insoluble polymer, and that at all temperatures below this threshold temperature the soluble polymer results. It is recognized, that high concentrations of cyclopentadiene and/or high proportions of uniformly distributed catalyst may place this theoretical threshold temperature below commercially obtainable temperature levels. However, for reasonable concentrations of cyclopentadiene and reasonable proportions of uniformly distributed catalyst a threshold temperature can be shown to exist for any given concentration of cyclopentadiene with any given proportion of uniformly distributed catalyst.

Also generally speaking, and all other conditions remaining the same, it appears that there is a threshold concentration of cyclopentadiene for the formation of insoluble polymer, and that at all concentrations below this threshold concentration the soluble form of polymer results. The term "concentration of cyclopentadiene" as used herein and in the claims signifies the proportion by weight of total cyclopentadiene whether reacted or not after all of the materials have been combined. It is recognized that inordinately high temperatures and/or inordinately high proportions of uniformly distributed catalyst may make the theoretical threshold concentration difficult of determination. However, for reasonable temperatures and reasonable proportions of uniformly distributed catalyst a threshold concentration of cyclopentadiene can be shown to exist at any given temperature with any given proportion of uniformly distributed catalyst.

Also generally speaking, and all other conditions remaining the same, and assuming that all of the materials have been combined, it appears that there is a threshold proportion of uniformly distributed catalyst for the formation of insoluble polymer, and that with all proportions below this threshold the soluble polymer results. In this connection experiments indicate quite clearly that catalyst is apparently used up during the polymerization of soluble polymer, and that additional catalyst is required to convert the soluble polymer into insoluble polymer. If the proportion of uniformly distributed catalyst is such that there is no catalyst available for the formation of insoluble polymer, none will be formed.

On the other hand, threshold proportions of catalyst are not required to polymerize all of the cyclopentadiene into the soluble polymer. Furthermore, the minimum proportion of uniformly distributed catalyst required to polymerize all of the cyclopentadiene to soluble polymer becomes less as the temperature or concentration of cyclopentadiene increases. These apparent anomalies, however, do not disprove the premise which is proven by experiment.

It is recognized that inordinately high temperatures and/or inordinately high concentrations of cyclopentadiene may make the theoretical threshold proportion of uniformly distributed catalyst difficult of determination. However, for reasonable temperatures and reasonable concentrations of cyclopentadiene a threshold proportion of uniformly distributed catalyst can be shown to exist at any given temperature with any given concentration of cyclopentadiene.

Also generally speaking, and all other conditions remaining the same, it appears that there is a threshold reaction time for the formation of insoluble polymer, and that for all reaction times below this threshold reaction time the soluble polymer results. It is recognized that low temperatures, low concentrations of cyclopentadiene, and/or low proportions of uniformly distributed catalyst may cause this theoretical threshold reaction time to approach infinity. However for relatively higher temperatures, for relatively higher concentrations of cyclopentadiene, and/or for relatively higher proportions of uniformly distributed catalyst, a threshold reaction time can be shown to exist.

From the foregoing it can be seen that high local concentration of catalyst is largely responsible for the formation of insoluble polymer when undiluted boron trifluoride gas is passed into solutions of cyclopentadiene, and that the influence of high local concentration of catalyst is not overcome even though the temperature is greatly reduced and even though fairly dilute concentrations of cyclopentadiene, namely 20% or 30% are employed.

However, in accordance with my invention, by suitable dilution of the boron trifluoride gas with an inert gaseous substance, high local concentration of catalyst may be avoided and substantially uniform distribution of catalyst may be obtained.

One result of high local concentration of catalyst, which persists in spite of thorough agitation, is the spontaneous formation of an insoluble film of polycyclopentadiene about the bubbles of gaseous catalyst to form small balls, resembling fish eggs, which float on the surface.

As an example of how this effect may be avoided, when the concentration of cyclopentadiene is 20% by weight, the temperature 25° C., and the addition of gas is accompanied by thorough agitation, the volume concentration of boron trifluoride gas in the gaseous mixture should not exceed about 5%.

Thus if the undesired formation of insoluble ball-like material is obtained, the catalyst should be further diluted, or other conditions changed to avoid this undesirable effect.

The following example will further illustrate the invention.

0.075 gram of boron trifluoride gas was diluted with fifty times its volume of nitrogen and was then slowly fed into a solution of 30 grams of cyclopentadiene in 120 grams of toluene with thorough stirring. The temperature was maintained between 30° and 48° C. during the addition.

The mixture was then agitated for an hour whereupon the catalyst was hydrolyzed by the addition of 1 cubic centimeter of water with agitation for fifteen minutes. This was followed by agitation for one hour with 5 grams of milk of lime $(Ca(OH)_2)$. 5 grams of filter aid (fuller's earth) were then added and the mixture filtered.

The product was 122.5 grams of a 15.3% solution of the soluble polymer.

Incidentally it should be noted that a control of the reaction time is afforded in the above example in that hydrolysis of the catalyst inactivates the same and stops further polymerization.

The catalyst might have been inactivated and removed by any other means, for instance, by hydrolysis with and solution of hydrolysis products in ethyl alcohol in which the soluble type polymer is insoluble. Addition of ethyl alcohol in place of the addition of water has the effect of precipitating the soluble polymer in a more or less purified condition.

Should some insoluble polymer be formed due to a failure to strictly observe the above conditions, the process is still of some utility since the soluble polymer may be separated by dissolving it out such as with toluene leaving the insoluble polymer behind. This, of course, is not possible if the above conditions are widely departed from and all insoluble polymer formed.

The temperature of the reaction may be conveniently controlled by employing a conventional jacketed vessel provided with an agitator. The combined action of the cooling medium in the jacket and the agitator makes it possible to avoid local superheating.

In the above example (1) temperature, (2) concentration of cyclopentadiene, (3) proportion of uniformly distributed catalyst and (4) time may be varied somewhat in the production of soluble polymer having in mind what has been said with respect to threshold conditions. If it is found that insoluble polymer is obtained, although there is present in the boron trifluoride gas a substantial quantity of gaseous diluent sufficient to avoid the effects of high local concentration, one or more of the four conditions, namely (1) temperature, (2) concentration of cyclopentadiene, (3) proportion of uniformly distributed catalyst and (4) time should be reduced until the soluble polymer is obtained.

Generally speaking for the formation of soluble polymer to the exclusion of insoluble polymer temperatures should rarely exceed 100° C., and possibly should preferably not exceed 80° C., concentrations of cyclopentadiene should rarely exceed 30% by weight of the total solution, and proportions of uniformly distributed catalyst should rarely exceed 5% by weight of cyclopentadiene, although these values are not to be considered as fixed limits. By having extremely low values for one or two of the items mentioned the third might exceed the value given. The time permitted for the desired reaction should, of course, be a reasonable one permitting the desired manipulations and results. In fact this might be found necessary or it might be found that there are minimum values that must be exceeded in any case to cause the desired reaction to take place. On the other hand, if all three values stated were used simultaneously insoluble polymer would most likely be formed.

Other inert gases may be used in place of nitrogen, examples of which are the noble gases namely, helium, neon, argon, krypton, xenon and radon, the more available of which might be used industrially in place of nitrogen should this be desired.

An extremely interesting modification of the above invention is the substitution of a less inert gas for all or a part of the nitrogen. Such less inert gas may be hydrogen, oxygen, sulfur dioxide, air or other relatively active gas.

While the invention has been described in connection with the bubbling of the gas into the liquid, it is to be understood that the liquid and gas may be contacted in any other manner. For instance, the liquid may be placed in a closed container provided with an agitator and the diluted gas may be admitted into the space above the liquid, or the diluent such as air or nitrogen may be first admitted to this space followed by undiluted or only partially diluted gas. In this case the liquid absorbs the catalyst from the gas phase and a smooth continuous reaction is obtained without spontaneous evolution of large quantities of heat.

In fact, when the gas is bubbled into the liquid as above described some catalyst may escape from the liquid, in which case, if the container is closed, a combination of effects is obtained in that catalyst is absorbed not only directly from the bubbles but also from the gas space above the liquid.

Other variations will suggest themselves to persons skilled in the art upon becoming familiar with this invention.

It follows that the above particular description is by way of illustration and that changes, omissions, additions, substitutions and/or modifications might be made within the scope of the claims without departing from the spirit of the invention which is intended to be limited only as required by the prior art.

I claim:

1. In the polymerization of cyclopentadiene wherein boron trifluoride gas is employed as a catalyst, the steps of passing said boron trifluoride gas into a solution of said cyclopentadiene while admixed with a second gas, and stopping the reaction while soluble polymer is present in the reaction mass.

2. In the polymerization of cyclopentadiene wherein boron trifluoride gas is employed as a catalyst, the steps of passing said boron trifluoride gas in highly diluted form into a solution of said cyclopentadiene, the diluent for said boron trifluoride gas being non-reactive, and stopping the reaction while soluble polymer is present in the reaction mass.

3. In a process for the polymerization of cyclopentadiene in which boron trifluoride gas is used to catalyze the reaction, the steps of controlling the uniformity and rate of the reaction comprising admixing with said boron trifluoride prior to contact with said cylopentadiene a large proportion of an inert gas, contacting said cyclopentadiene with said admixture, and stopping the reaction while soluble polymer is present in the reaction mass.

4. A process comprising slowly adding to a dilute solution of cyclopentadiene with thorough agitation a gaseous mixture having as a constituent boron trifluoride, said addition of said gaseous mixture being sufficient in amount to cause the formation of soluble polymer, and stopping the reaction while soluble polymer is present in the reaction mass.

5. A process for the polymerization of cyclopentadiene comprising slowly adding to said cyclopentadiene with through agitation a gaseous mixture having as constituents a small proportion of boron trifluoride and a large proportion of inert gas, said addition of said gaseous mixture being sufficient in amount to cause the formation of polymer, and stopping the reaction while soluble polymer is present in the reaction mass.

6. A process comprising slowly adding to a dilute solution of cyclopentadiene not greater than 30% by weight in concentration a gaseous mixture having as a constituent a small quantity of boron trifluoride while thoroughly agitating and maintaining the temperature below 100° C., said addition of said gaseous mixture being sufficient in quantity to cause the formation of soluble polymer, and inactivating the catalyst to stop the reaction before insoluble polymer begins to form.

7. A process comprising slowly adding to a dilute solution of cyclopentadiene between 5% and 30% by weight in concentration a gaseous mixture of boron trifluoride and an inert gas while thoroughly agitating and maintaining the temperature below 80° C., the concentration of boron trifluoride in said gaseous mixture being sufficiently low to avoid the spontaneous formation of insoluble polymer at the interfaces of the particles of said gaseous mixture and said solution, said addition of said gaseous mixture being sufficient in quantity to cause said boron trifluoride to catalyze the formation of soluble polymer, and stopping the reaction before insoluble polymer begins to form.

8. A process comprising slowly adding to a dilute solution of cyclopentadiene not exceeding approximately 30% by weight in concentration boron trifluoride gas in a highly diluted form, the diluent being an inert gas and present in sufficient quantity to prevent the spontaneous formation of insoluble ball-like material thoroughly agitating said solution during said addition to immediately uniformly distribute said gas throughout said solution, controlling the temperature of the ensuing reaction such that the temperature at no point exceeds 80° C., said addition of said gaseous mixture being sufficient in quantity to cause said boron trifluoride to catalyze the formation of soluble polycyclopentadiene, hydrolyzing the catalyst before insoluble polymer begins to form, and removing the products of hydrolysis.

9. In a process for the polymerization of cyclopentadiene in solution wherein boron trifluoride gas is employed as a catalyst, the step of diluting said boron trifluoride gas sufficiently to avoid spontaneous formation of insoluble polymer at gas-liquid interfaces.

10. A process for catalytically polymerizing cyclopentadiene, comprising adding to a mixture of cyclopentadiene and a solvent with agitation a gaseous mixture of boron triflurde and a diluent, said diluent being present in sufficient quantity in said gaseous mixture to prevent any substantial spontaneous formation of insoluble polymer at gas-liquid interfaces under the polymerization conditions obtaining, adding sufficient of said gaseous mixture to said mixture of cyclopentadiene and solvent to catalyze the formation of soluble polymer, and stopping the reaction while soluble polymer is present in the reaction mass.

11. A process for catalytically polymerizing cyclopentadiene, comprising contacting said cyclopentadiene while in solution in a solvent with boron trifluoride admixed with a gaseous diluent, said diluent being present in sufficient quantity to prevent any substantial spontaneous formation of insoluble polymer at the interfacial contact between gas and solution under the polymerizing conditions obtaining, agitating the solution of cyclopentadiene and solvent while in contact with said diluted boron trifluoride to absorb sufficient boron trifluoride in said solution to catalyze the formation of polymer, and stopping the reaction while soluble polymer is present in the reaction mass.

12. A process for catalytically polymerizing cyclopentadiene comprising bringing into contact with said cyclopentadiene boron trifluoride in the presence of a diluent gas, said diluent gas being present in sufficient quantity where gas contacts liquid to prevent any appreciable spontaneous formation of insoluble polymer under the polymerizing conditions obtaining, absorbing sufficient of said boron trifluoride in said cyclopentadiene to catalyze the formation of polymer, and stopping the reaction while soluble polymer is present in the reaction mass.

NEWCOMB K. CHANEY.